United States Patent
Puppin

(10) Patent No.: US 9,836,442 B1
(45) Date of Patent: Dec. 5, 2017

(54) SYNCHRONIZATION AND PLAYBACK OF RELATED MEDIA ITEMS OF DIFFERENT FORMATS

(71) Applicant: Google Inc., Mountain View, CA (US)

(72) Inventor: Diego Puppin, Arlington, MA (US)

(73) Assignee: Google LLC, Mountain View, CA (US)

( * ) Notice: Subject to any disclaimer, the term of this patent is extended or adjusted under 35 U.S.C. 154(b) by 420 days.

(21) Appl. No.: 13/765,627

(22) Filed: Feb. 12, 2013

(51) Int. Cl.
*G06F 17/00* (2006.01)
*G06F 17/24* (2006.01)

(52) U.S. Cl.
CPC .................................... *G06F 17/24* (2013.01)

(58) Field of Classification Search
CPC ............. G06F 17/3079; G06F 17/3082; G06F 17/30855
See application file for complete search history.

(56) References Cited

U.S. PATENT DOCUMENTS

| | | | | |
|---|---|---|---|---|
| 9,099,089 | B2* | 8/2015 | Dzik | G10L 15/26 |
| 9,158,765 | B1* | 10/2015 | Story, Jr. | G06F 17/30 |
| 9,244,678 | B1* | 1/2016 | Hatch | G11B 27/02 |
| 2005/0216919 | A1* | 9/2005 | Hull | G06F 17/30017 |
| | | | | 719/322 |
| 2009/0191531 | A1* | 7/2009 | Saccocci | G09B 5/062 |
| | | | | 434/317 |
| 2009/0300539 | A1* | 12/2009 | Hendricks | G06F 17/2235 |
| | | | | 715/779 |
| 2010/0050064 | A1* | 2/2010 | Liu | G06F 17/2765 |
| | | | | 715/202 |
| 2010/0162092 | A1* | 6/2010 | Albu | G06T 15/04 |
| | | | | 715/202 |
| 2011/0106970 | A1* | 5/2011 | Song et al. | 709/236 |
| 2011/0177481 | A1* | 7/2011 | Haff | G06F 17/30032 |
| | | | | 434/317 |
| 2011/0288861 | A1* | 11/2011 | Kurzweil et al. | 704/235 |
| 2012/0001923 | A1* | 1/2012 | Weinzimmer | G06F 3/013 |
| | | | | 345/473 |
| 2012/0236201 | A1* | 9/2012 | Larsen | H04N 21/235 |
| | | | | 348/468 |
| 2012/0266058 | A1* | 10/2012 | Miller, Jr. | G06F 17/24 |
| | | | | 715/205 |
| 2012/0315009 | A1* | 12/2012 | Evans | H04N 5/765 |
| | | | | 386/230 |

(Continued)

OTHER PUBLICATIONS

Ebook Architects, "Enhanced eBooks," Last updated Mar. 29, 2013, 3 pages [online] Retrieved on May 22, 2013] Retrieved from the internet <URL:www.ebookarchitects.com/conversions/enhanced.php#video>.

(Continued)

*Primary Examiner* — Scott Baderman
*Assistant Examiner* — Matthew G McVicker
(74) *Attorney, Agent, or Firm* — Shumaker & Sieffert, P.A.

(57) ABSTRACT

A synchronized media item is generated and presented to a user via a user client. The user client receives a synchronization point including a location identifier that identifies a location within a media item linked to a location within a related media item. The user client inserts the received synchronization point into the media item at the identified location to create a synchronized media item. The user client presents the synchronized media item and the synchronization point.

9 Claims, 5 Drawing Sheets

(56) References Cited

U.S. PATENT DOCUMENTS

| | | | |
|---|---|---|---|
| 2013/0013991 A1* | 1/2013 | Evans | H04N 5/765 715/206 |
| 2013/0145394 A1* | 6/2013 | Bakke | H04N 21/472 725/38 |
| 2014/0019893 A1* | 1/2014 | Gudmundsson | G06F 17/30011 715/764 |
| 2014/0039887 A1* | 2/2014 | Dzik | G10L 15/26 704/235 |
| 2014/0095608 A1* | 4/2014 | Mandalia | G06F 17/30855 709/204 |
| 2014/0164360 A1* | 6/2014 | Nickolov | G06F 17/30637 707/722 |
| 2014/0164366 A1* | 6/2014 | Narayanan | G06F 17/30014 707/723 |
| 2014/0164890 A1* | 6/2014 | Fox | G06F 17/24 715/202 |
| 2014/0250219 A1* | 9/2014 | Hwang | G06F 17/2827 709/224 |

OTHER PUBLICATIONS ipadtest.wordpress.com, "iBooks ePub Can Now Do Embedded Video," Mike Cane's iPAD Test, May 14, 2010, 4 pages [online] [Retrieved on May 22, 2013] Retrieved from the internet <URL:www.ipadtest.wordpress.com/2010/05/14/ibooks-epub-can-now-do-embedded-video/>.

* cited by examiner

US 9,836,442 B1

SYNCHRONIZATION AND PLAYBACK OF RELATED MEDIA ITEMS OF DIFFERENT FORMATS

BACKGROUND

Field of Disclosure

This disclosure relates to the field of synchronization and playback of related media items of different formats.

Description of the Related Art

As tablet computers, smart phones, and e-readers increase in popularity, more and more consumers are using these devices to consume both media content such as videos and music, and text content, such as e-books. Some devices allow users to listen to media and read e-books alternatively by utilizing separate audio/video player and e-reader applications. In such devices, a user chooses a presentation format (e.g., video, audio, e-book) to receive content, and the content is presented by the appropriate application. But, if the user decides to change the presentation format while content is being presented, the user may have to manually exit the active application, execute the appropriate application, retrieve the content in the correct format, and manually locate the correct playback position in the retrieved content.

SUMMARY

The above and other needs are met by computer-implemented methods, non-transitory computer-readable storage mediums storing executable code, and devices for synchronizing media items in a media-management system and presenting the synchronized media items to a user via a user client.

One embodiment of the computer-implemented method for presenting a synchronized media item via a user client, comprises receiving a synchronization point including a location identifier that identifies a location within a media item linked to a location within a related media item, such that at least one of the media item and the related media item is a video. The retrieved synchronization point is inserted into the media item at the identified location to create a synchronized media item. The synchronized media item and the synchronization point are presented to a user of the user client.

One embodiment of a device for presenting a synchronized media item, comprises a processor for executing computer program instructions and a non-transitory computer-readable storage medium. The non-transitory computer-readable storage medium stores computer program instructions executable to perform steps, comprising receiving a synchronization point including a location identifier that identifies a location within a media item linked to a location within a related media item, such that at least one of the media item and the related media item is a video. The retrieved synchronization point is inserted into the media item at the identified location to create a synchronized media item. The synchronized media item and the synchronization point are presented to a user of the user client.

One embodiment of the computer-implemented method for synchronizing media items comprises identifying one or more related media items to produce a cluster of related media items. Textual content for each pair of related media items in the cluster is analyzed to detect locations of corresponding content. Location identifiers and related location identifiers are created using locations of corresponding content in each pair of related media items, such that the location identifiers identify particular locations of content in a first media item in a pair, and the related location identifiers identify corresponding locations of corresponding content in related second media item of the pair. One or more synchronization points are created using the location identifiers and the related location identifiers. The one or more synchronization points are stored in a synchronization table.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures and may indicate similar or like functionality.

Figure 1:
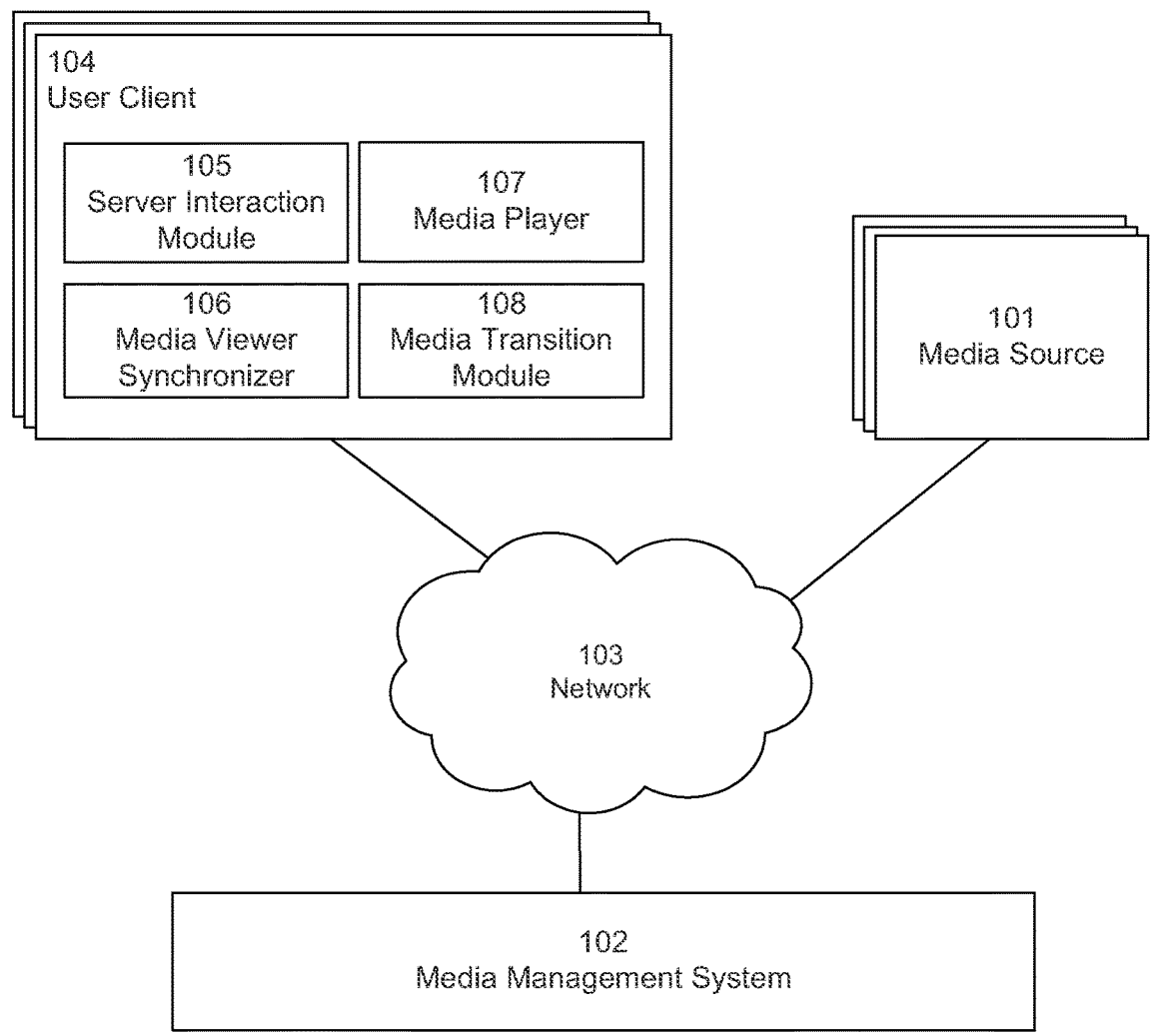
FIG. 1 is a high-level block diagram illustrating an embodiment of a media-management system connected by a network to a plurality of user clients and a plurality of media sources.

FIG. 1 is a high-level block diagram illustrating an embodiment of a media-management system (MMS) 102 connected by a network 103 to a plurality of user clients 104 and a plurality of media sources 101. Here only a few user clients 104 and media sources 101, and a MMS 102 are illustrated but there may be multiple instances of each of these entities. For example, there may be thousands or millions of user clients 104 in communication with multiple MMS's 102 and media sources 101.

The network 103 provides a communication infrastructure between the user clients 104, the media sources 101, and the MMS 102. The network 103 is typically the Internet, but may be any network, including but not limited to a Local Area Network (LAN), a Metropolitan Area Network (MAN), a Wide Area Network (WAN), a mobile wired or wireless network, a private network, or a virtual private network.

The media sources 101 are computer servers that host media items associated with content that are made available to the user clients 104 and/or the MMS 102. A media item is content that has been formatted for presentation to a user in a specific manner. For example, a media item may be an e-book, a video file, an audio file, or some other format. The media sources 101 may directly provide media items to the user clients 100 via the network 103, or they may provide media items that are stored by the MMS 102, and made available to the user client 104 from the MMS 102.

Media items are related if they possess the same or similar content. Same content refers to a perfect correspondence in the content between media items directed to the same underlying story. Similar content refers to an imperfect correspondence in the content between media items that are directed to the same underlying story. For example, a movie based off a novel has similar content to that novel. For example, the e-book "The Fountainhead" by Ayn Rand would be related to a movie or audio book based on The Fountainhead, but would not be related to any e-book or movie not possessing the same or similar content (e.g., the book "Atlas Shrugged," the movie "Fight Club," etc.). A media item may be related to a plurality of other media items. Additionally, a media item may be related to different versions of the media item. In some instances, novels are republished multiple times, sometimes with slightly differing content. Likewise, movies are sometimes remade with slightly different storylines, but still directed toward the same underlying story. For example, an e-book of a novel published in 1910, an e-book the novel re-published in 2010, a movie released in 1970 made based on the novel, and a movie released in 2011 made based on the later published novel, are media items that are all related to each other.

The MMS 102 synchronizes a media item with one or more related media items. The MMS identifies related media items, and creates one or more synchronization points that link a particular location in a media item to corresponding locations in the identified one or more related media items. For example, a synchronization point may link a paragraph in an e-book to a location in a video where the thematic content of the paragraph occurs.

A synchronization point includes a media identifier for the media item, one or more related media identifiers, a location identifier, and one or more related location identifiers. A media identifier uniquely identifies a media item, such that it may be received from a media source 101, or in some embodiments, MMS 102 and/or a local memory. A related media identifier is media identifier that uniquely identifies a related media item. A location identifier is a unique data item that identifies a particular location in a media item. For example, a location identifier identifies a particular location in an e-book being read by the user, e.g., a particular word number, page number, paragraph, etc. A related location identifier is a unique data item that identifies a location in a media item related to the media item that corresponds to the corresponding content at the location identified by the location identifier. For example, if the location identifier identifies a paragraph of an e-book, the related location identifier would identify the corresponding location where the same or same or similar content of the paragraph occurs in the related media item. Corresponding content generally refers to the same thematic elements, e.g., the chapter of a book corresponding to a particular scene in a movie. The corresponding content may be identified by comparing text from the book and movie to identify the corresponding portions, but it doesn't necessarily mean that the text from the book and movie are the same.

The MMS 102 receives media management information from the user client 104. The media management information may include a synchronization request, data about the user, requests for format-change points, media identifiers, location identifiers, media item requests, social signaling information, or some combination thereof. The media-management information may also include information about the user such as a user identifier, which may be used by the MMS 102 to identify a unique user. A synchronization request may be received when the user client 104 is requesting synchronization points for a media item. A synchronization request includes a media identifier for the requested media item. The MMS 102 is configured to provide one or more synchronization points to the user client 104 for association with the requested media item based on the synchronization request. In alternate embodiments, the MMS 102 may provide the requested media item, the requested media item including one or more synchronization points, or both.

The user clients 104 are computing devices that execute computer program modules—e.g., a web browser, e-book reader, media player, or other client application—which allow a user to view e-books and consume other audio and/or video data. A user client 104 might be, for example, a personal computer, a tablet computer, a smart phone, a laptop computer, an e-reader, or other type of network-capable device such as a networked television or set-top box. The user client 104 may also allow a user to establish a user profile with the MMS 102.

A user client 104 comprises a server interaction module 105, a media viewer synchronizer 106, a media player 107, and a media transition module 108 in one embodiment. In one embodiment these entities are software application modules executing on the user client 104. For example, the modules 105, 106, 107, and 108 may be integrated into a smart phone application executing on a smart phone.

The server interaction module 105 communicates data between the user client 104, and the MMS 102 and the media source 101, via the network 103. The server interaction module 105 sends media management information via the network 103, to the MMS 102. Additionally, the server interaction module 105 may receive synchronization points, media items, or both, from the MMS 102, and media items from the media source 101.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location). In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by user client 104 and MMS 102.

The media viewer synchronizer 106 synchronizes media items. A synchronized media item is a media item that includes one or more synchronization points that have been inserted into the media item. In one embodiment, the media viewer synchronizer 106 receives from the MMS 102 one or more synchronization points that link a media item with one or more related media items. The media viewer synchronizer 106 compares a media identifier associated with the media item to be synchronized with a media identifier received from synchronization points received from the MMS 102. If the media identifiers are the same, the media viewer synchronizer 106 inserts one or more of the synchronization points in the media item at locations identified using the synchronization point, to create a synchronized media item.

The synchronization points are inserted in the media item at locations identified by the location identifiers in the synchronization points being inserted. For example, a synchronization point being synchronized with a video file contains a location identifier. The media viewer synchronizer 106 places the synchronization point at the location in the video file identified by the location identifier (e.g., at 30 minutes into playback). The media viewer synchronizer 106 then communicates with the media player 107 to present the synchronized media item to the user. In this embodiment, the media viewer synchronizer 106 synchronizes one or more of the received synchronization points with the associated media item prior to the media item being presented to the user. In alternate embodiments, a user may request that a media item be synchronized at any time.

The media player 107 presents media items requested by a user operating user client 104. The media player 107 may be configured to present media items and synchronized media items of different media formats (e.g., e-book, video, and audio). The media player 107 receives the requested media item over the network 103 from the media source 101 and/or other sources such as e-book retailers, video retailers, audio retailers, libraries, or a local memory, using a media identifier or media item metadata. Additionally, in some embodiments, media player 107 may receive the requested media item from MMS 102. In one embodiment, prior to presentation of the media item the media player 107 requests that the media viewer synchronizer 106 synchronize the media item. The media player 107 receives the synchronized media item from the media viewer synchronizer 106 and presents the synchronized media item to the user. In alternate embodiments, the user can request that the media item be synchronized at any time.

The media player 107 presents one or more synchronization points as executable interfaces (e.g., icon, thumbnail graphic, video frame, hyperlink, etc.) that when selected (e.g., by a user) cause the synchronized media item being presented to change to a specified related media item. The executable interface may be positioned in the media item at a location proximate to, or otherwise associated with, the location identified by the location identifier in the synchronization point. Thus, the executable interface for a particular synchronization point is presented when the relevant portion of the synchronized media is presented to the user.

The media player 107 may present the synchronization points visibly or audibly. For example, in an e-book the presentation of the executable interface may be a visible marker indicating the presence of the synchronization point inserted at a location in the text. The marker may be a frame of video extracted from the synchronized location of related video content. Likewise, for videos the media player 107 may present synchronization points to the user by, for example, displaying an icon for a period of time. In some embodiments, the period of time corresponds to when corresponding content occurs in the related media item. And for audio content, the media player 107 may present a synchronization point to the user as, for example, an audio cue (e.g., beep or tone). In some embodiments, the audio cue corresponds to when portions of the audio file are reached that have corresponding content in the related media item. The media transition module 108 receives requests from the user to change from the synchronized media item being presented to the user to a related media item via selection of a synchronization point. Once a synchronization point has been selected, the media transition module 108 instructs the media player 107 to obtain the related media item. Note, that in some embodiments, the requested media item may also be a synchronized media item.

The media transition module 108 instructs the media player 107 to present the related media item at the location identified using the synchronization point. Specifically, the media transition module 108 instructs the media player 107 to present the related media item at a location indicated in the related location identifier. For example, a user reading content formatted for an e-book may request to view the same content as a video file beginning at a particular synchronization point. The selected synchronization point may be, for example, the last paragraph the user read in the e-book. The media transition module 108 instructs the media player 107 to play back the video file at the location identified in the related location identifier (e.g., the location in the video file that contains the same or similar content to the location of the last paragraph read by the user in the e-book).

In some cases, there may be multiple media items related to the media item being presented. In such cases, when activation of a synchronization point is detected, the media transition module 108 may prompt the user to select which of the related media items the user wishes to view. The media transition module 108 identifies the possible media items to present using the related media identifiers in the selected synchronization point. In alternate embodiments, the media transition module 108 may automatically select which related media item to present (e.g., most recently published and/or released) to the user when a synchronization point is selected. Or, the media transition module 108 may be configured to select which media item to present based on user preferences previously set by the user.

Figure 2:
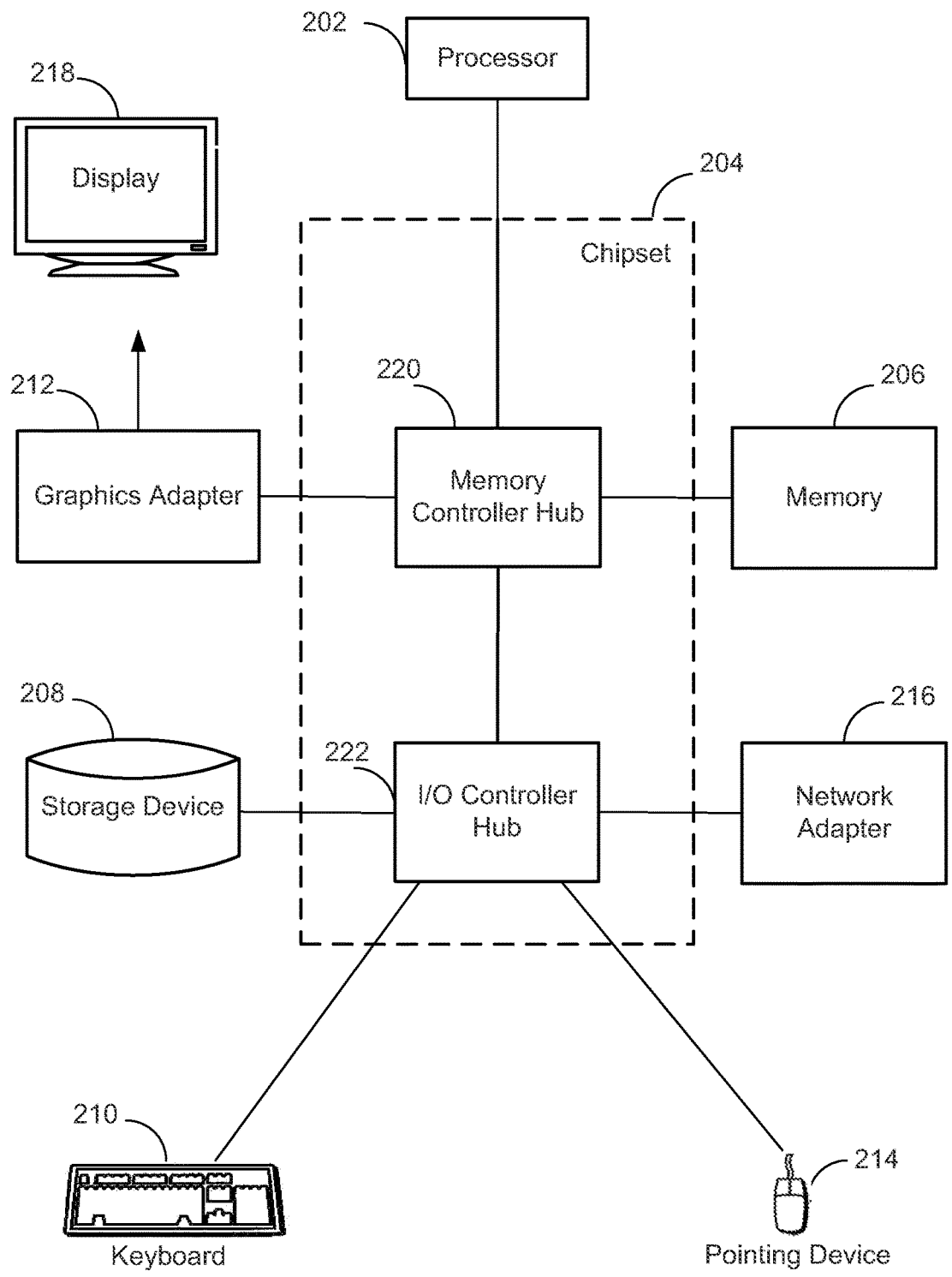
FIG. 2 is a high-level block diagram illustrating an example computer for implementing the entities shown in FIG. 1.

FIG. 2 is a high-level block diagram illustrating an example computer 200 for implementing the entities shown in FIG. 1. The computer 200 includes at least one processor 202 coupled to a chipset 204. The chipset 204 includes a memory controller hub 220 and an input/output (I/O) controller hub 222. A memory 206 and a graphics adapter 212 are coupled to the memory controller hub 220, and a display 218 is coupled to the graphics adapter 212. A storage device 208, keyboard 210, pointing device 214, and network adapter 216 are coupled to the I/O controller hub 222. Other embodiments of the computer 200 have different architectures.

The storage device 208 is a non-transitory computer-readable storage medium such as a hard drive, compact disk read-only memory (CD-ROM), DVD, or a solid-state memory device. The memory 206 holds instructions and data used by the processor 202. The pointing device 214 is a mouse, track ball, or other type of pointing device, and is used in combination with the keyboard 210 to input data into the computer 200. The graphics adapter 212 displays images and other information on the display 218. The network adapter 216 couples the computer 200 to one or more computer networks.

The computer 200 is adapted to execute computer program modules for providing functionality described herein. As used herein, the term "module" refers to computer program logic used to provide the specified functionality. Thus, a module can be implemented in hardware, firmware, and/or software. In one embodiment, program modules are stored on the storage device 208, loaded into the memory 206, and executed by the processor 202.

The types of computers 200 used by the entities of FIG. 1 can vary depending upon the embodiment and the processing power required by the entity. For example, the MMS 102 might comprise multiple blade servers working together to provide the functionality described herein. The computers 200 can lack some of the components described above, such as keyboards 210, graphics adapters 212, and displays 218. In addition, the MMS 102 can run in a single computer 200 or multiple computers 200 communicating with each other through a network such as in a server farm.

Figure 3:
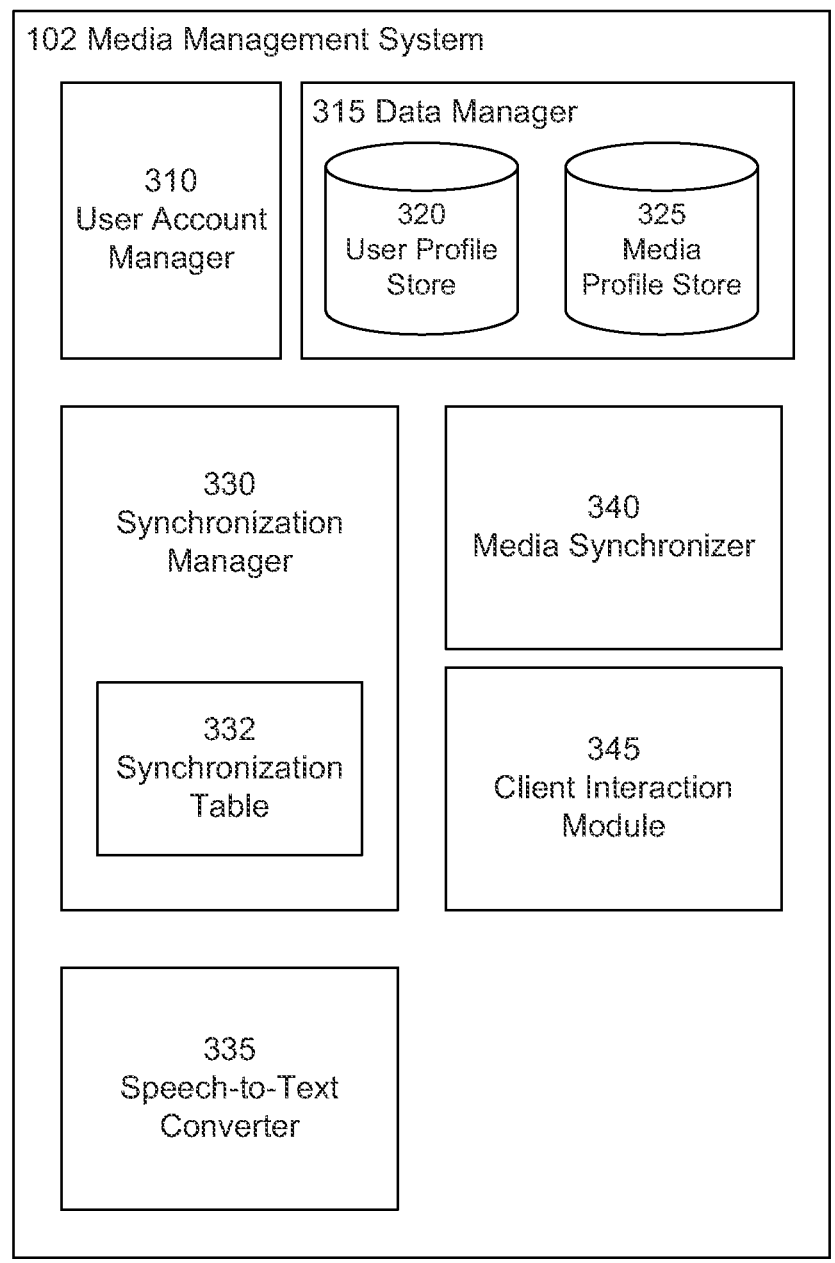
FIG. 3 is a high-level block diagram illustrating a detailed view of modules within the media-management system, according to one embodiment.

FIG. 3 is a high-level block diagram illustrating a detailed view of modules within the MMS 102, according to one embodiment. Some embodiments of the MMS 102 have different modules than those described here. Similarly, the functions can be distributed among the modules in a different manner than is described here. The MMS 102 is comprised of a user account manager 310, data manager 315, synchronization manager 330, speech-to-text converter 335, media synchronizer 340, and client interaction module 345.

The user account manager 310 receives media management information from the user client 104, via the client interaction module 345, and enables the MMS 102 to identify and authenticate the user. Each user may have a distinct account on the MMS 102.

The data manager 315 stores and manages user information, media management information, and data related to media items. The data manager 315 comprises a user profile store 320 and a media profile store 325, in one embodiment.

The user profile store 320 stores user profiles, which each may contain data related to a single user. The user profile for a user may contain media item preference data for that user, media item presentation history, as well as other information related to the user that has been received by the data manager 315. This information may be provided by users on establishing their accounts with the MMS 102, or the information may be inferred or obtained from other sources. Each user's profile may contain references to the profiles of other individuals with whom that user shares a connection (friends, family, co-workers, etc.).

The media profile store 325 stores information related to media items. The information for each media item may be stored in a media item profile for that media item. For a given media item, the media item profile may contain a media identifier, content of the media item, media item metadata, or some combination thereof. The media item metadata describes different aspects of the media item. The metadata may comprise, for example, author, date of publishing, reviews, genre information, publisher, ratings, artist, genre, date of release, actors, user ratings etc. In some embodiments, the media item metadata may also include the media item identifier.

The synchronization manager 330 identifies one or more related media items to produce one or more clusters of related media items. A cluster is a group of related media items. The synchronization manager 330 may use a media item's metadata to identify one or more clusters of related media items. The synchronization manager 330 may use a media identifier to obtain metadata from, for example, the media profile store 325, the media source 101, or both. The synchronization manager 330 may use some or all of the metadata to identify related media items and their associated media identifiers. For example, the synchronization manager 330 may match the author and title information with metadata associated with other media items. If there is a match, the synchronization manager 330 updates a synchronization table 332 with the media identifiers of the related media items. Additionally, in some embodiments, an administrator manually updates the synchronization table 332 with media identifiers, related media identifiers, location identifiers, and related location identifiers.

The synchronization manager 330 analyzes the textual content for each pair of related media items in a cluster to detect locations of corresponding content. The synchronization manager 330 receives the pair of media items being analyzed from, for example, the media profile store 325, the media source 101, some other source, or some combination thereof. A media item may be located in plurality of different pairs within a cluster. For each pair of media items in the cluster, the synchronization manager 330 compares portions of the text content associated with one media item of the pair with the text content of the other media item in the pair. The compared portions may correspond to, for example, entire content, chapters, sections, paragraphs, sentences, words or phrases, etc., of the text content. Additionally, comparing portions of the related media items may involve using the speech-to-text converter 335 to generate text from non-textual media items, and may also use other information, such as table of content information, etc. The text content may exist in a media item (e.g., e-book), it may be received from the speech-to-text-converter 335 for the media, or both.

The synchronization manager 330 scores the compared portions of the related media items to determine whether the compared portions have corresponding content. The synchronization manager 330 generates a score describing the level of correspondence between two portions being compared. The score may be based on, for example, the amount of words in common, the high-value words (e.g., through term frequency inverse document frequency), or some other means. The synchronization manager 330 declares the compared portions of content as corresponding content if the compared portions have a score exceeding a threshold value. For example, if a movie is converted to its lines (via speech-to-text-converter 335), the synchronization manager 330 may run a similarity detection task, that would identify related books and movies if the number of matching lines exceeds a threshold value. Additionally, in some embodiments, an administrator of the MMS 102 may manually identify whether one or more media items are related. The administrator may then manually update the synchronization table 332 with for example, media identifiers, related media identifiers, location identifiers, related location identifiers, or some combination thereof.

The synchronization manager 330 may use information derived from punctuation or formatting in the text to identify corresponding content. In one embodiment, synchronization manager 330 analyzes the text to identify portions of text content that are spoken by characters in a story. For example, the media synchronizer may identify quotation marks to determine what text corresponds to spoken character content. In some embodiments, the synchronization manager 330 only compares the spoken lines of the text content. Alternatively, the synchronization manager 330 may weight spoken lines of text more so than other portions of the text content to identify corresponding content in related media items.

The speech-to-text converter 335 converts audio content (or portions thereof) associated with media items into text content. The speech-to-text converter 335 can convert the audio content from a video file and/or audio file to text content. For example, the speech-to-text converter 335 may convert any spoken words, such as words spoken by characters in a story, into equivalent text content. Additionally, the speech-to-text converter 335 maintains an index or record of where in media item the speech-to-text conversion occurs. The speech-to-text converter 335 provides portions of the text content (converted audio content) to the media synchronizer 340. In some embodiments, some text content may be part of a video file, for example, captioning information (i.e., close captioning or subtitle information). In these cases, the speech-to-text converter 335 may not need to covert the audio content to text content, and may provide the synchronization manager 330 with the captioning information as text content. Additionally, in some embodiments speech-to-text converter 335 is able to convert and translate the audio content into one or more different languages.

The media synchronizer 340 creates location identifiers and related location identifiers using the identified locations of corresponding content for each pair of media items. For the identified areas of corresponding content, the media synchronizer 340 creates a location identifier identifying the location of content correspondence in the media item being synchronized and a related location identifier identifying the location of the corresponding content in the related media item.

The synchronization manager 330 creates one or more synchronization points for each pair of media items using the location identifiers and the related location identifiers. The synchronization manager 330 retrieves a media identifier, a location identifier, one or more related media identifiers, and one or more related location identifiers from the synchronization table 332. The synchronization manager 330 assembles the retrieved media identifier, the location identifier, one or more related media identifiers, and one or more related location identifiers into one or more synchronization points.

The synchronization manager 330 stores the one or more synchronization points in a synchronization table 332. The synchronization table 332 maps media items to one or more synchronization points. Additionally, the synchronization table 332 maps media items to one or more related media items. And, for each media item, the synchronization table 332 maps location identifiers to corresponding related location identifiers for one or more related media items. For example, given a media identifier and a location identifier, the synchronization manager 330 is able to determine what other media items are related to the media item associated with the given media identifier, and determine their respective related location identifiers.

The client interaction module 345 communicates data between the user client 104, and the MMS 102 and the media source 101, via the network 103. The user account manager 310 distributes the media management information to other modules in the MMS 102. The client interaction module 345 receives media management information via the network 103, from one or more user clients 104. Additionally, the client interaction module 345 may send synchronization points, media items, or both, to user clients 104.

In response to a synchronization request, the client interaction module 345 provides one or synchronization points to a requesting user client 104. The client interaction module 345 may receive a synchronization request included in the media management information from user client 104. The client interaction module 345 extracts a media identifier from the synchronization request. The synchronization manager 330 compares the media identifier to the media identifiers in the synchronization table to 332 locate and retrieve one or more synchronization points associated with the media item identified by the media identifier. The client interaction module 345 provides the retrieved one or more synchronization points to the user client 104.

Figure 4:
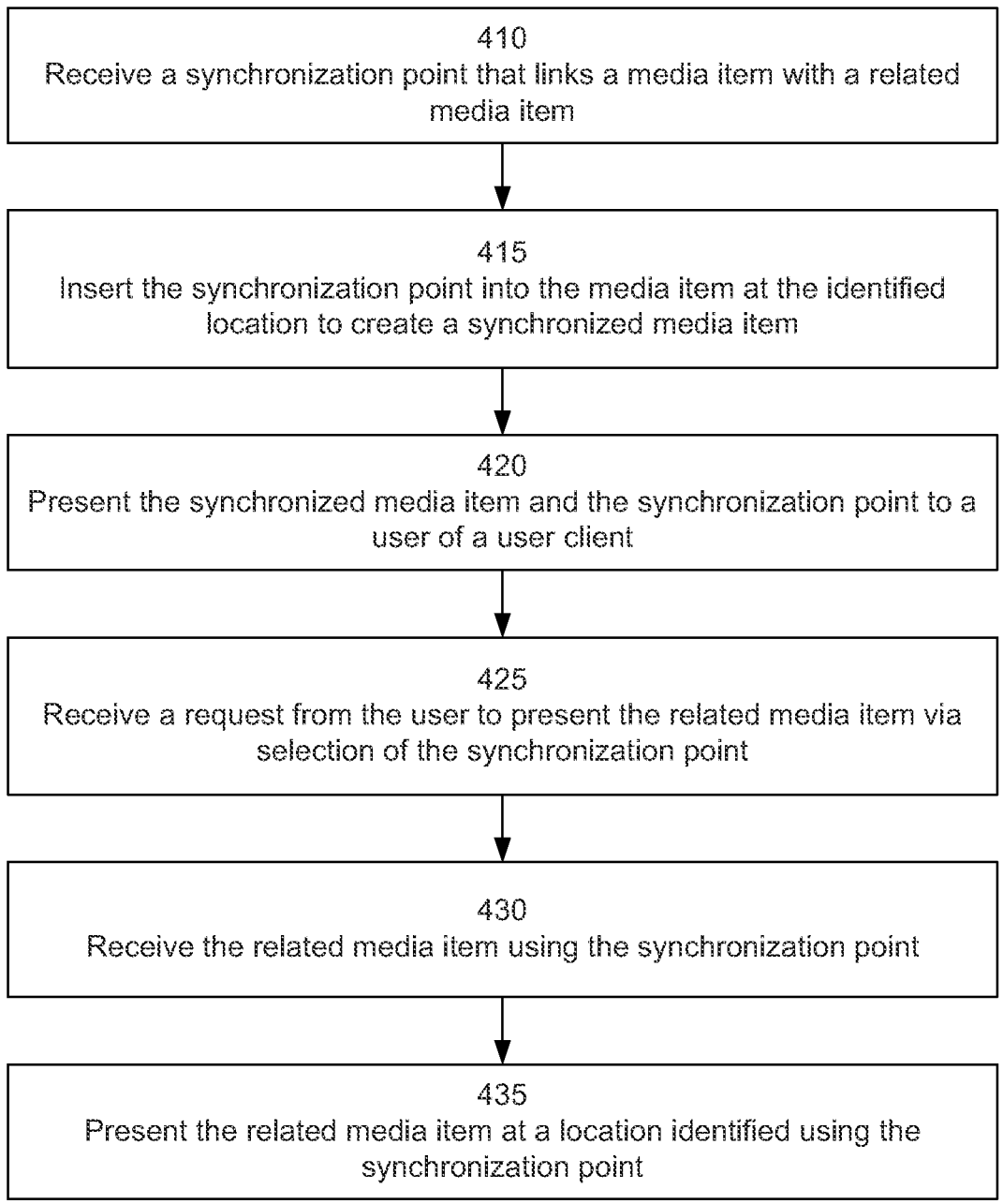
FIG. 4 is a flowchart illustrating the process of presenting synchronized media items in a user client, according to one embodiment.

FIG. 4 is a flowchart illustrating the process of presenting synchronized media items in a user client 104, according to one embodiment. In this embodiment the user client 104 receives 410 a synchronization point that links a media item with a related media item. For example, the user client 104 may receive the synchronization point from MMS 102 via a synchronization request for the requested media item. In some embodiments the user client 104 may receive the synchronization point from a local memory. Additionally, in some embodiments, the related media item is a video.

The user client 104 inserts 415 the synchronization point into the media item at the identified location to create a synchronized media item. The user client 104 positions the synchronization point such that it is proximate to the location described by a location identifier within the synchronization point. The user client 104 presents 420 the synchronized media item and the synchronization point to a user of the user client 104. The synchronization point is presented to the user as an executable interface that when selected by the user causes the user client to present content at the linked-to location of the related media item.

At some point, the user client 104 receives 425 a request from the user to present the related media item, via selection of the synchronization point. The user client 104 detects activation of the synchronization point by the user. In some embodiments, responsive to the detected activation, the user client prompts the users to select one of a plurality of related media items. For example, a user reading an e-book may select a synchronization point indicating a desire to view related video content.

The user client 104 receives 430 the related media item using the synchronization point. The user client 104 then presents 435 the related media item at a location identified using the synchronization point. For example, the user client 104 can present the related media item using the media player 107. The location where presentation of the related media item begins is determined by a related location identifier within the synchronization point.

Figure 5:
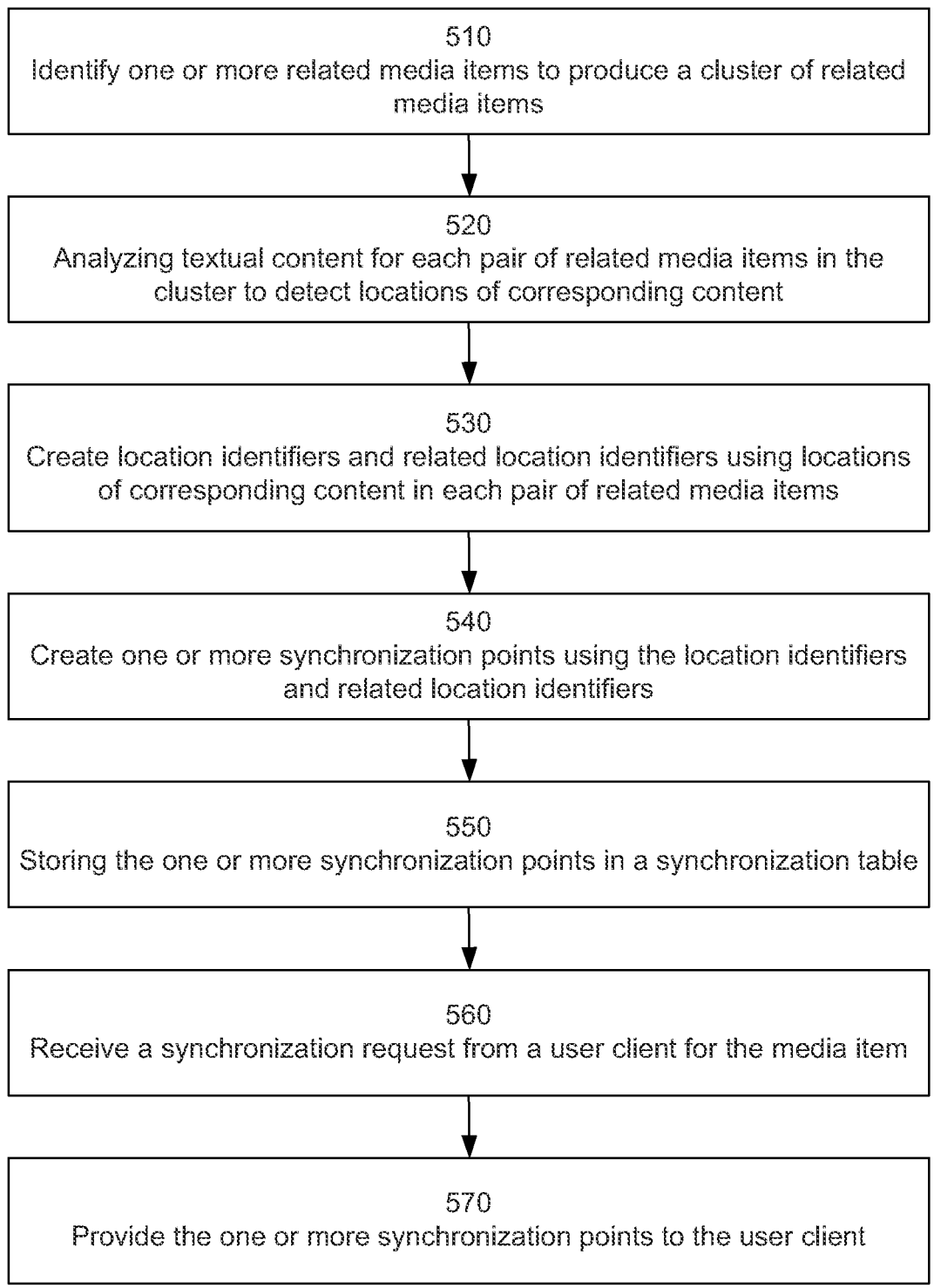
FIG. 5 is a flowchart illustrating the process of synchronizing media items in a media-management system, according to one embodiment.

FIG. 5 is a flowchart illustrating the process of synchronizing media items in a MMS 102, according to one embodiment. In this embodiment the MMS 102 identifies 510 one or more related media items to produce a cluster of related media items. For example, the MMS 102 may use a media item's metadata to identify one or more related media items.

Once one or more of the related media items are identified, the MMS 102 analyzes 520 the textual content for each pair of related media items in the cluster to detect locations of corresponding content. In some instances, if the media item or any of the related media items contain audio or video content, the MMS 102 converts the audio/video content to text content. The MMS 102 compares portions of the media item's text content to portions of the text content of the related media items. The MMS 102 scores the compared portions of the related media items and declares the compared portions to have corresponding content if the scores are above a threshold value.

The MMS 102 creates 530 location identifiers and related location identifiers using locations of corresponding content in each pair of related media items. The MMS 102 then creates 540 one or more synchronization points using the location identifiers and the related location identifiers. The MMS 102 stores 550 the one or more synchronization points in a synchronization table 332.

The MMS 102 receives 560 a synchronization request from a user client for the media item. The MMS extracts a media identifier from the synchronization request. The MMS 102 uses the media identifier to retrieve the one or more synchronization points from the synchronization table 332. The MMS 102 then provides 570 the one or more synchronization points to the user client 104.

Some portions of the above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a system and a process for automated media recommendation generation. Thus, while particular embodiments and applications have been illustrated and described, it is to be understood that the described subject matter is not limited to the precise construction and components disclosed herein and that various modifications, changes and variations which will be apparent to those skilled in the art may be made in the arrangement, operation and details of the method and apparatus disclosed herein.

The invention claimed is:

1. A computer-implemented method comprising:
   receiving a synchronization point including a location identifier that identifies a location within an e-book linked to a respective location of each of a plurality of related media items, and a plurality of media identifiers that each uniquely identify a respective one of the plurality of related media items, wherein each media item of the plurality of related media items is directed to a same story as the e-book and has a different media format than the e-book and other related media items, wherein the e-book includes text, and wherein the plurality of related media items includes a video;
   inserting, within the text of the e-book, a image of the video, the image being extracted from a linked-to location within the video, the image of the video being a visible marker indicating a presence of the synchronization point at the location within the e-book;
   presenting a synchronization point interface element that includes at least a portion of the e-book that includes text at the location of the e-book linked to the location of the video and the image of the video extracted from the linked-to location within the video;
   detecting activation of the synchronization point interface element; and
   responsive to detecting the activation of the synchronization point interface element:
      identifying, based on the plurality of related media identifiers, the plurality of related media items;
      prompting a selection of one of the plurality of related media items; and
      responsive to receiving the selection of the one of the plurality of related media items, presenting content of the one of the one of the plurality of related media items included at the respective location of the one of the plurality of related media items specified by the synchronization point.

2. The computer-implemented method of claim 1, wherein the location within the e-book and the linked-to location within the video include corresponding thematic content of the same story.

3. The computer-implemented method of claim 1, wherein presenting the content comprises:
   presenting the content at a location proximate to the location of the e-book at which the image of the video is inserted.

4. A device comprising:
   a display;
   a network adapter;
   a processor for executing computer program instructions; and
   a non-transitory computer-readable storage medium storing computer program instructions executable by the processor to:
      receive, via the network adapter, a synchronization point including a location identifier that identifies a location within an e-book linked to a respective location of each of a plurality of related media items and a plurality of media identifiers that each uniquely identify a respective one of the plurality of related media items, wherein each media item of the plurality of related media items is directed to a same story as the e-book and has a different media format than the e-book and other related media items, wherein the e-book includes text, and wherein the plurality of related media items includes a video;
      insert, within the text of the e-book, a image of the video, the image being extracted from a linked-to location within the video, the image of the video being a visible marker indicating a presence of the synchronization point at the location within the e-book;

present, using the display, a synchronization point interface element that includes at least a portion of the e-book that includes text at the location of the e-book linked to the location of the video and the image of the video extracted from the linked-to location within the video;

detect activation of the synchronization point interface element; and responsive to detecting the activation of the synchronization point interface element:
    identify, based on the plurality of related media identifiers, plurality of related media items;
    prompt, using the display, a selection of one of the plurality of related media items; and
    responsive to receiving the selection of the one of the plurality of related media items, present, using the display, content of the one of the plurality of related media items included at the respective location of the one of the plurality of related media items specified by the synchronization point.

5. The device of claim 4, wherein the location within the e-book and the linked-to location within the video include corresponding thematic content of the same story.

6. The device of claim 4, wherein the computer program instructions are executable by the processor to present the synchronization point by at least being executable to comprises:

present the content at a location of the display proximate to the location of the e-book at which the image of the video is inserted.

7. A non-transitory computer-readable storage medium encoded with instructions that, when executed by one or more processors of a computing device, cause the one or more processors to:

receive a synchronization point including a location identifier that identifies a location within an e-linked to a respective location of each of a plurality of related media items and a plurality of media identifiers that each uniquely identify a respective one of the plurality of related media items, wherein each media item of the plurality of related media items is directed to a same story as the e-book and has a different media format than the e-book and other related media items, wherein the e-book includes text, and wherein the plurality of related media items includes a video;

insert, within the text of the e-book, a image of the video, the image being extracted from a linked-to location within the video, the image of the video being a visible marker indicating a presence of the synchronization point at the location within the e-book;

present a synchronization point interface element that includes at least a portion of the e-book that includes text at the location of the e-book linked to the location of the video and the image of the video extracted from the linked-to location within the video;

detect activation of the synchronization point interface element; and responsive to detecting the activation of the synchronization point interface element:
    identify, based on the plurality of related media identifiers, the plurality of related media items;
    prompt a selection of one of the plurality of related media items; and
    responsive to receiving the selection of the one of the plurality of related media items, present content of the one of the plurality of related media items included at the respective location of the one of the plurality of related media items specified by the synchronization point.

8. The non-transitory computer-readable storage medium of claim 7, wherein the location within the e-book and the linked-to location within the video include corresponding thematic content of the same story.

9. The non-transitory computer-readable storage medium of claim 7, wherein the instructions are executable by the one or more processors to present the synchronization point by at least being executable to:

present the content at a location of the display proximate to the location of the e-book at which the image of the video is inserted.

\* \* \* \* \*